May 15, 1934.  H. M. WARE  1,958,455
JOINING FLEXIBLE SHEET MATERIAL
Filed Aug. 6, 1930
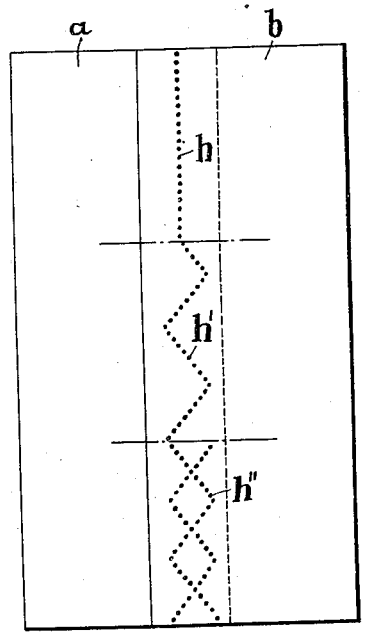
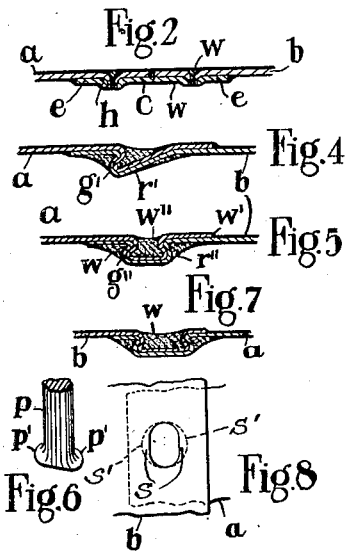
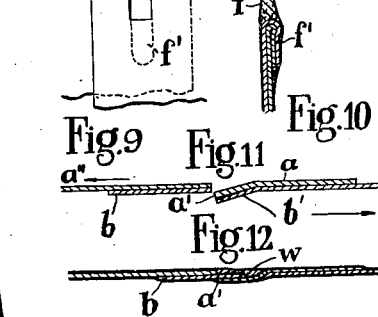
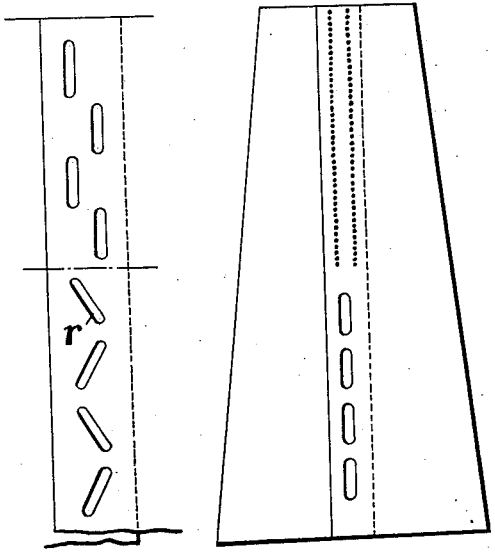
Fig.1, Fig.2, Fig.3, Fig.4, Fig.5, Fig.6, Fig.7, Fig.8, Fig.9, Fig.10, Fig.11, Fig.12, Fig.13, Fig.14
INVENTOR
Herbert MacLean Ware,
BY
Lester L. Sargent
ATTORNEY Patented May 15, 1934

1,958,455

UNITED STATES PATENT OFFICE 1,958,455

JOINING FLEXIBLE SHEET MATERIAL

Herbert Maclean Ware, South Croydon, England

Application August 6, 1930, Serial No. 473,442
In Great Britain August 6, 1929

1 Claim. (Cl. 154—42)

This invention relates to a process and means for joining together two pieces of flexible material such as cardboard, paper, wood pulp, and the like. The invention is applicable to the manufacture of cardboard boxes, cases, containers of all kinds and is especially adapted for use in the construction of bottles for containing liquids and which, subsequent to manufacture, are treated with wax or other substance which permeates the material or forms a deposit on the surface for the purpose of making the container fluid proof.

The joints and seams in boxes, containers and bottles as above referred to are usually made either by the attachment of clips or by some adhesive. The present invention obviates the necessity of such fixing means.

The invention consists essentially in a process of punching or impressing two layers of material in such a manner that parts or fragments pressed out from the one layer take into grooves or impressions or holes made in the corresponding layer, the joint thus formed being then treated with a deposit of wax, rubber solution, or any other suitable material which is adapted to set into a solid coating and thereby form a key giving an additional tensile strength to the joint and preventing lateral displacement of the parts.

The invention may be carried into effect in a great variety of ways some of which are illustrated in the accompanying drawing in which:—

Fig. 1 represents a side view of a joint made according to the simplest form of the invention.

Fig. 2 is a cross section of the same to an enlarged scale.

Fig. 3 represents a side view of a modified form.

Figs. 4 and 5 represent cross sections of same to an enlarged scale.

Figs. 6 to 13 further modifications.

Fig. 14 represents a container made in accordance with the invention.

Referring to Figs. 1 and 2. When it is required to join two pieces of material such as $a$ and $b$ holes are pierced such as $h$ $h$ with any suitably shaped needle or punch such that parts of $a$ penetrate into $b$ as shewn in enlarged scale in Fig. 2. If then the parts joined are pulled in the direction of their surface they can only be separated if the parts of $a$ which penetrate $b$ are sheared off in the process unless by lateral movement the interpenetrating parts of $a$ can be withdrawn from $b$. This withdrawal of $a$ from $b$ is prevented in accordance with this invention by coating the parts with wax, rubber, varnish, or any other suitable material as at $w$ which will set in a hard coat when deposited, and which, by holding down the edges $e$ $e$ will hold the parts together and by entering the holes $h$ $h$ will form a series of keys or rivets preventing the lateral movement of the parts.

These holes may be arranged in any desired manner as shewn at $h'$ and $h''$ Fig. 1 and may be pierced from within outwards or from without inwards and some may be in one direction and some in the other.

In a modification shown in Figs. 9 and 10 part of the material of $a$ may be punched out and folded over $b$ the folded over portion $f$ being firmly secured by the wax or other deposit $w$ the hole $f$ being filled with wax which forms a key from side to side.

In a further modification illustrated in Figs. 4 and 5 the joint is made by a ridge or series of ridges $r$ pressed out of the one part $a$ into a groove or series of grooves pressed out in the other part $b$. These grooves and ridges may be undercut in one direction as at $g'$ $r'$ or in both directions as at $g''$ $r''$. The coating material then covers the edges as at $w'$ and enters the interstices as at $w''$ forming a key which binds the parts and secures them against lateral movement.

In a further modification a rotatable punch is used by which studs $s$ may be pressed out of the part $a$ into corresponding recesses $s'$ pressed out in the part $b$ as shown in enlarged scale in Figs. 7 and 8. The punch $p$ used in this operation is preferably formed as shown in Fig. 6 having an elliptical end $p'$ and when the first impression is made with this punch a turn of the punch is made so that the parts $p'$ $p'$ form an undercut recess within the material as shown in dotted lines in Fig. 8 thus binding the parts $a$ and $b$ together, the subsequent deposit of wax or other substance as at $w$ making a rigid joint.

In a still further modification illustrated in Figs. 11 to 13 tongues as at $a'$ $b'$ are pressed out of the pieces $a$ and $b$. If then these latter are traversed one upon the other that is to say $a$ is pulled in the direction shown by the arrow at $a''$ and $b$ is pulled in the direction of the arrow at $b''$ then the punched out portion $a'$ of the piece $a$ will come to overlap the face of $b$ as shown in Fig. 12. The overlapping part can then be fixed in that position by waxing as shown and the recesses left by the overlapping will likewise be filled up as illustrated at $w$. Thus a very strong form of hooked key is produced making a joint of great strength. This joint may be made in both directions if desired, that is from within outwards or from without inwards as shown in Fig. 13.

The invention has been described and illustrated as applying to joints in which one part of a container overlaps another part but the invention is equally applicable to butt joints which are overlapped by an added piece of material as illustrated at c in connection with perforations in Fig. 2.

It should be understood that the methods by which the invention may be carried into effect are very various and that the foregoing description only relates to certain preferred forms.

It should be understood that any kind or shape of needle, or punch, or mandrel, or disc may be used such as may be found convenient, for bringing about the required results as embodying the invention, also that the invention may be applied to the construction of any form or shape of container.

I claim:

A process for making a container for holding liquids and solids consisting in making the joints in the material by piercing out reversely disposed tongues in each part, traversing the one part over the other part so that the tongue and pierced out portions of the respective parts overlap and coating the joints thus formed with unset material such as rubber, wax, varnish and the like adapted by setting on the joint to form keys to hold the parts against lateral movement.

HERBERT MACLEAN WARE.